United States Patent
Wilson (10) Patent No.: US 10,406,685 B1
(45) Date of Patent: Sep. 10, 2019

(54) ROBOT END EFFECTOR CONTROL

(71) Applicant: X Development LLC, Mountain View, CA (US)

(72) Inventor: Robert Wilson, Pacifica, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 222 days.

(21) Appl. No.: 15/492,422

(22) Filed: Apr. 20, 2017

(51) Int. Cl.
  B25J 9/00 (2006.01)
  B25J 9/16 (2006.01)
  B25J 15/08 (2006.01)

(52) U.S. Cl.
  CPC ........... B25J 9/1633 (2013.01); B25J 15/08 (2013.01); *G05B 2219/39322* (2013.01)

(58) Field of Classification Search
  USPC .................................................. 700/245–264
  See application file for complete search history.

(56) References Cited

U.S. PATENT DOCUMENTS

| | | | | |
|---|---|---|---|---|
| 4,367,891 A * | 1/1983 | Wauer | ................... | B25J 15/0009 269/266 |
| 4,860,215 A * | 8/1989 | Seraji | ....................... | B25J 9/163 700/260 |
| 4,921,293 A * | 5/1990 | Ruoff | ....................... | A61F 2/583 294/106 |
| 4,957,320 A * | 9/1990 | Ulrich | ...................... | B25J 9/102 192/56.1 |
| 4,974,210 A * | 11/1990 | Lee | ......................... | B25J 9/1682 700/260 |
| 4,980,626 A * | 12/1990 | Hess | ....................... | B25J 9/1005 250/559.33 |
| 5,103,404 A * | 4/1992 | McIntosh | ............... | A63B 24/00 318/568.22 |
| 5,108,140 A * | 4/1992 | Bartholet | ............. | B25J 15/0009 294/106 |
| 5,172,951 A * | 12/1992 | Jacobsen | ................. | A61F 2/588 294/104 |

(Continued)

OTHER PUBLICATIONS

Marchal-Crespo, L., & Reinkensmeyer, D. J. (Jun. 16, 2009). Review of control strategies for robotic movement training after neurologic injury. Journal of neuroengineering and rehabilitation, 6(1), 20; 15 pages.

(Continued)

*Primary Examiner* — Jonathan L Sample
(74) *Attorney, Agent, or Firm* — Middleton Reutlinger (57) ABSTRACT

Techniques are provided for achieving stable tracking and/or manipulation by robots of objects. In various implementations, it may be detected, based on force signal(s) from force sensor(s), that an end effector of the robot has made physical contact with an environmental object. Based on the force signal(s), end effector constraint(s) may be identified. These constraint(s) may include a position constraint associated with position control of the end effector and/or a grasp force constraint associated with grasp force control of the end effector. Error measure(s) may be determined based on a measured position/force of the end effector. The error measure(s) may include a position control and/or grasp control error. The measured position and/or force may be compared with the end effector constraint(s) to reduce an impact of the error measure(s) on operation of the robot.

18 Claims, 6 Drawing Sheets

(56) References Cited

U.S. PATENT DOCUMENTS

| | | | | |
|---|---|---|---|---|
| 5,499,320 | A | * | 3/1996 | Backes .................. B25J 9/1602 700/260 |
| 5,501,498 | A | * | 3/1996 | Ulrich ..................... B25J 9/102 294/106 |
| 5,721,477 | A | | 2/1998 | Sepehri et al. |
| 5,762,390 | A | * | 6/1998 | Gosselin .............. B25J 15/0009 294/106 |
| 5,967,580 | A | * | 10/1999 | Rosheim .................... B25J 3/04 294/106 |
| 6,147,674 | A | | 11/2000 | Rosenberg et al. |
| 6,517,132 | B2 | * | 2/2003 | Matsuda .............. B25J 15/0009 294/106 |
| 6,786,896 | B1 | * | 9/2004 | Madhani ................ B25J 9/1615 606/1 |
| 6,817,641 | B1 | * | 11/2004 | Singleton, Jr. ........... B25J 9/102 294/106 |
| 7,168,748 | B2 | * | 1/2007 | Townsend .............. B25J 9/1612 294/106 |
| 7,289,884 | B1 | * | 10/2007 | Takahashi .............. B25J 9/1612 700/245 |
| 7,340,100 | B2 | * | 3/2008 | Higaki ..................... G06F 3/017 382/199 |
| 7,549,688 | B2 | * | 6/2009 | Hayakawa ............. B25J 9/0009 294/106 |
| 8,280,837 | B2 | * | 10/2012 | Platt ....................... B25J 9/1612 294/110.1 |
| 8,297,672 | B2 | * | 10/2012 | Kim ........................ B25J 9/104 294/106 |
| 8,346,393 | B2 | * | 1/2013 | Kim ...................... B25J 9/1612 700/261 |
| 8,364,314 | B2 | * | 1/2013 | Abdallah ............... H01R 13/17 700/264 |
| 8,463,434 | B2 | * | 6/2013 | Takahashi .............. B25J 9/1612 318/568.16 |
| 8,483,882 | B2 | * | 7/2013 | Abdallah ............... H01R 13/17 700/245 |
| 8,504,198 | B2 | * | 8/2013 | Takahashi .............. B25J 9/1612 700/245 |
| 9,381,645 | B1 | * | 7/2016 | Yarlagadda ............ G05B 19/42 |
| 2004/0028260 | A1 | * | 2/2004 | Higaki ..................... G06F 3/017 382/118 |
| 2005/0125099 | A1 | * | 6/2005 | Mikami .................. G06N 3/008 700/245 |
| 2006/0012198 | A1 | * | 1/2006 | Hager ..................... B25J 9/1612 294/106 |
| 2006/0128316 | A1 | * | 6/2006 | Moller .................... G09B 23/32 455/67.15 |
| 2007/0010913 | A1 | * | 1/2007 | Miyamoto .............. B25J 9/1658 700/264 |
| 2007/0018470 | A1 | * | 1/2007 | Hayakawa ............. B25J 9/0009 294/106 |
| 2007/0219668 | A1 | * | 9/2007 | Takahashi .............. B25J 9/1612 700/249 |
| 2007/0236162 | A1 | * | 10/2007 | Kawabuchi ............. B25J 9/102 318/568.16 |
| 2008/0046122 | A1 | * | 2/2008 | Manzo ................ A61B 1/00149 700/245 |
| 2008/0077361 | A1 | * | 3/2008 | Boyd .................... B25J 9/1612 702/189 |
| 2008/0114491 | A1 | * | 5/2008 | Takahashi .............. B25J 9/1612 700/245 |
| 2009/0069942 | A1 | * | 3/2009 | Takahashi .............. B25J 9/1633 700/260 |
| 2009/0088775 | A1 | * | 4/2009 | Swarup .................. A61B 34/37 606/130 |
| 2009/0248038 | A1 | * | 10/2009 | Blumenkranz ........ B25J 13/085 606/130 |
| 2009/0302626 | A1 | * | 12/2009 | Dollar ..................... B25J 9/104 294/106 |
| 2009/0306825 | A1 | * | 12/2009 | Li ........................... B25J 9/1669 700/261 |
| 2010/0011899 | A1 | * | 1/2010 | Kim ......................... B25J 9/104 74/490.04 |
| 2010/0138039 | A1 | * | 6/2010 | Moon .................... B25J 9/1612 700/245 |
| 2010/0161129 | A1 | * | 6/2010 | Costa ..................... B25J 9/1697 700/259 |
| 2010/0161130 | A1 | * | 6/2010 | Kim ....................... B25J 9/1612 700/261 |
| 2010/0280661 | A1 | * | 11/2010 | Abdallah ............... H01R 13/17 700/260 |
| 2010/0280663 | A1 | * | 11/2010 | Abdallah ............... H01R 13/17 700/264 |
| 2011/0067521 | A1 | * | 3/2011 | Linn ................... B25J 15/0009 74/490.06 |
| 2012/0283875 | A1 | * | 11/2012 | Klumpp ................. B25J 9/1648 700/258 |
| 2013/0184868 | A1 | * | 7/2013 | Inazumi ................. B25J 9/1633 700/258 |
| 2013/0184869 | A1 | * | 7/2013 | Inazumi ................. B25J 9/1633 700/260 |
| 2014/0324219 | A1 | * | 10/2014 | Dumora ................. B25J 9/1679 700/258 |
| 2016/0073584 | A1 | * | 3/2016 | Davidson ............... A01D 46/30 56/328.1 |
| 2016/0107316 | A1 | * | 4/2016 | Alt ........................ B25J 9/1697 700/259 |
| 2017/0266816 | A1 | * | 9/2017 | Takeuchi ............... B25J 9/1633 |
| 2017/0274530 | A1 | * | 9/2017 | Mottram ................ B25J 9/1633 |

OTHER PUBLICATIONS

Veiga, F, & Peters, J. (Dec. 24, 2016). Can Modular Finger Control for In-Hand Object Stabilization be accomplished by Independent Tactile Feedback Control Laws?. arXiv preprint arXiv:1612.08202.; 7 pages.

Hou, Y., et al. (2016). Robust Planar Dynamic Pivoting by Regulating Inertial and Grip Forces. Robotics Institute, Carnegie Mellon University. 16 pages.

\* cited by examiner

Fig. 6

ROBOT END EFFECTOR CONTROL

BACKGROUND

When end effectors of robots make physical contact with objects in an environment, including but not limited to objects that are to be acted upon by the robot, the objects may provide environmental impedance due to their mass/weight/stiffness. For example, when a robot positions and operates a gripper-style end effector to grasp and pull an object, the object's weight may provide impedance to the pulling force being applied by the robot. Various aspects of the robot, such as a position of the end effector (sometimes referred to herein as "grasp position") and a grasp torque applied by the end effector, may be independently adjustable to control how the robot interacts with the object. Grasp torque applied by the end effector may be selectable. Actual grasp force experienced by the end effector may be caused by a combination of the grasp force applied by the end effector, any simultaneous repositioning of the end effector, and the mass/weight/stiffness of the object being interacted with.

End effector constraints of actuators and/or joints of the robot and the amount of impedance applied by the object being interacted with by the robot may impose limits as to how the robot can be safely operated. For instance, these limits may be a set of potential positions of the end effector and corresponding potential grasp torque values that can be safely achieved by the end effector at each potential position. Applying too much grasp torque at a given position, or attempting to reposition the end effector too much when the end effector is experiencing a particular grasp force, may lead to adverse outcomes, such as the end effector missing its precise target (e.g., due to static friction, or "stiction"), undesirable oscillation and/or "hunting," motor overheating, and in some instances, robot stalling. For example, suppose a gripper end effector is moved to a given position near an outer limit of the robot's reach and grabs an object to be acted upon by the robot. One or more joints or actuators of the robot may consequently be strained to near their operational limits. If a difference (i.e. a grasp force error) between a desired grasp torque value and a potential grasp torque value associated with the given grasp position of the end effector is too great, the robot may cause one or more of these joints or actuators to overheat while attempting to achieve the desired grasp force.

SUMMARY

The present disclosure is generally directed to techniques for, given desired grasp positions and/or desired grasp torques for end effectors, determining robot instructions (e.g., actuator/joint control commands) that achieve stable tracking and/or manipulation of objects with acceptable response characteristics. In various implementations, a robot may be instructed to reposition and/or control its end effector to act upon an object in an environment. Due to its mass/weight/stiffness, physical contact with and/or manipulation of the object may apply a force to the end effector. Consequently, initial physical contact between the end effector and the object may be detected based on one or more force signals from one or more force sensors associated with the robot.

The force applied by the object on the end effector may contribute to position control errors and/or grasp force errors. A position control error may be indicative of an offset of the end effector from a desired position of the end effector. A grasp force error may be indicative of an offset between force provided by the end effector and a desired grasp force. Robot controllers, such as grasp position controllers and/or grasp torque controllers, may constantly attempt to correct for these detected errors, e.g., by generating robot instructions (e.g., joint/actuator commands) that cause robot actuator/joints to attempt to correct these errors. However, correction of these errors may strain the operational abilities of the actuators/joints, which can cause one or more of the aforementioned adverse outcomes.

Accordingly, and based on the force signals, one or more so-called "end effector constraints" of the end effector and/or robot may be identified. These end effector constraints may include, for instance, position constraints associated with grasp position control of the end effector and/or a grasp force constraints associated with grasp force control of the end effector. In some implementations, the end effector constraints may take the form of "deadbands" in which one or more error measures associated with the robot are ignored (or at least reduced). One type of deadband is a grasp position deadband that includes a range of grasp positions of the end effector in which any position control error is ignored. Another type of deadband is a grasp force deadband that includes a range of grasp forces in which the grasp force error is ignored. Other types of end effector constraints may include simple thresholds, a hysteresis, blending functions, etc.

Based on these constraints, the impact of error measures associated with the robot on operation of the robot may be reduced. For example, positional errors indicative of offsets of the end effector from desired grasp positions of the end effector may be ignored or reduced when the end effector is operated within the aforementioned position deadband. Put another way, a grasp position controller may take reduced or no corrective action in response to position control error(s) received while it operates in the position deadband. Similarly, grasp force errors indicative of offsets between grasp force provided by the end effector and desired grasp forces may be ignored or reduced when the end effector is operated within the aforementioned grasp force deadband. Put another way, a grasp torque controller may take reduced or no corrective action in response to grasp force error(s) received while it operates in the grasp deadband.

In some implementations, a method may include: detecting, based on one or more force signals from one or more force sensors operably coupled with a robot, that an end effector of the robot has made physical contact with an object in the environment; identifying, based on the one or more force signals, one or more end effector constraints of the end effector, wherein the one or more end effector constraints include one or more of: a position constraint associated with position control of the end effector, and a grasp force constraint associated with grasp force control of the end effector; determining a measured position of the end effector and a measured force of the end effector; determining, based on the measured position and the measured force, one or more error measures associated with the robot, wherein the one or more error measures includes one or more of: a position control error, and a grasp force error, wherein the position control error is indicative of an offset of the end effector from a desired position of the end effector, and the grasp force error is indicative of an offset between force provided by the end effector and a desired grasp force; comparing the measured position or the measured force with the one or more end effector constraints; and based on the comparing, reducing an impact of the one or more error measures on operation of the robot.

This method and other implementations of technology disclosed herein may each optionally include one or more of the following features.

In various implementations, the identifying may include identifying both the position constraint and the grasp force constraint. In various implementations, the reducing may include reducing an impact of the position control error on implementations of one or more position instructions that are included in the one or more robot control instructions. In various implementations, the reducing may include reducing an impact of the grasp force error on one or more grasp torque instructions that are included in the one or more robot control instructions.

In various implementations, the one or more end effector constraints may include one or more deadbands in which one or more error measures associated with the robot are ignored. In various implementations, one or more of the deadbands may be dynamic deadbands that are computed based on one or more signals. In various implementations, the dynamic deadbands may be computed based on the one or more force signals. In various implementations, the dynamic deadbands may be computed based on the desired grasp force. In various implementations, the one or more deadbands may include a position deadband comprising a range of positions of the end effector in which the position control error is ignored. In various implementations, the one or more deadbands may include a force deadband comprising a range of grasp forces in which the grasp force error is ignored.

Other implementations may include a non-transitory computer readable storage medium storing instructions executable by a processor to perform a method such as one or more of the methods described above. Yet another implementation may include a robot that includes one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
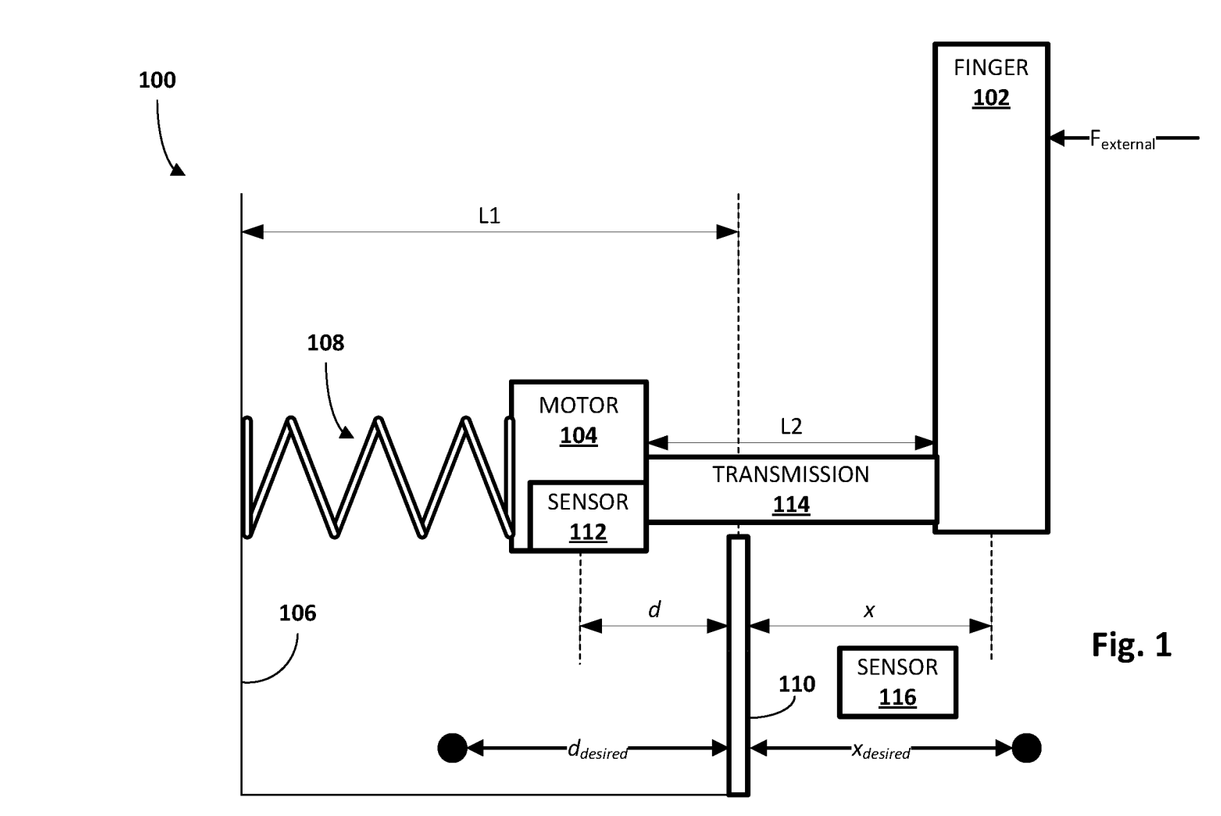
FIG. 1 schematically depicts an example system on which disclosed techniques may be employed, in accordance with various implementations.

FIG. 1 is a schematic diagram of an example robot system 100 for which selected aspects of the present disclosure may be practiced in accordance with various implementations. A robot such as that in which system 100 may be incorporated may take various forms, including but not limited to a telepresence robot, a robot arm, a humanoid, an animal, an insect, an aquatic creature, a wheeled device, a submersible vehicle, an unmanned aerial vehicle ("UAV"), and so forth.

In this example, system 100 includes one or more fingers 102 of a gripper-style robot end effector that may be used to act upon object in an environment in which a robot (not depicted) is deployed. System 100 also includes a motor carriage 104 (also referred to simply as "motor") that is attached to a fixed frame 106 (or the ground, or a carriage) by a spring 108. Spring 108 may have an associated spring constant, or stiffness constant K, that is specific to the spring used. A spring with a greater spring constant K may require more force to compress or expand than another spring having a lesser spring constant. Motor 104 may be configured to move with one degree of freedom in a direction parallel to L1 in FIG. 1 and its movement may be constrained at a first end (on the left in FIG. 1) by full compression of spring 108 and at a second, opposite end (right in FIG. 1) by a hard stop 110. In some implementations, motor 104 may be nominally loaded by spring 108 against hard stop 110 (e.g., the lowest possible energy configuration), though this is not required.

In various implementations, a sensor 112 may be configured to measure a position of motor 104 relative to hard stop 110. In some implementations, sensor 112 may take the form of a linear or rotary encoder (e.g., mechanical, optical, magnetic, capacitive, etc.) that is configured to detect rotation of transmission 114 relative to another component of system 100, such as motor 104, frame 106, hard stop 110, etc. Additionally or alternatively, sensor 112 may take the form of a potentiometer that detects a position of various components of system 100 relative to other components of system 100. In some implementations, displacement measured by sensor 112 may be equivalent to measured deflection of spring 108, and is indicated in FIG. 1 by d. This spring deflection also may be considered a unilateral force measurement that indicates a spring-compressing force applied to motor 104 in a leftward direction in FIG. 1.

Figure 5:
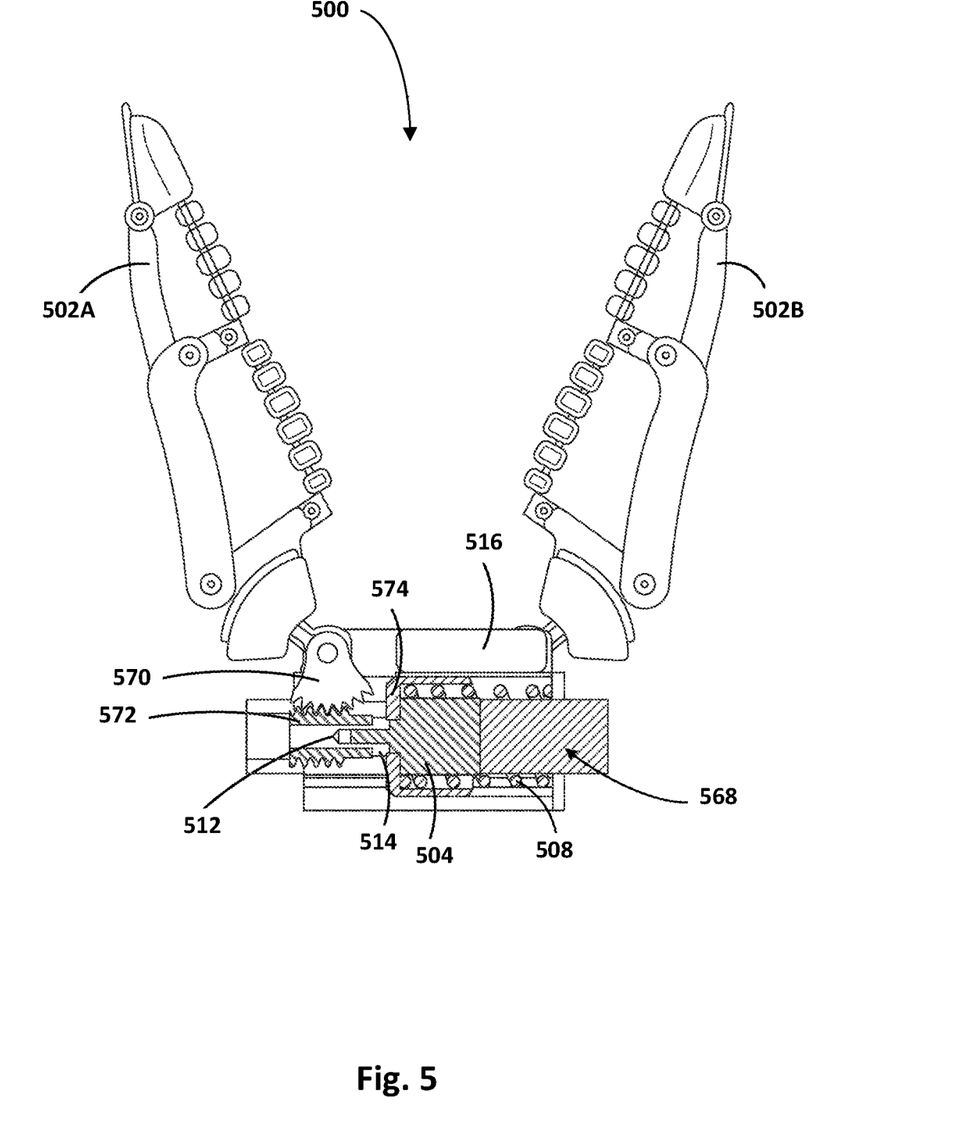
FIG. 5 depicts one "real world" example of an end effector for which disclosed techniques may be implemented, in accordance with various implementations.

In various implementations, motor 104 may be coupled with a transmission 114 that is actuated (e.g., rotated in one or more directions) by motor 104 (e.g., motor 104 provides the input) and coupled to finger 102 (or another end effector tool) that effectively receives the output. Motor 104 may actuate (e.g., rotate) transmission 114 so that total displacement between motor 104 and finger 102, L2 in FIG. 1, may be adjusted as needed. While L2 is depicted as linear in FIG. 1, this is not meant to be limiting, and in various implementations, linear displacement, rotational displacement, or any combination thereof, may be effected. In some implementations, transmission 114 may take the form of a so-called "worm drive," e.g., a shaft with a "worm" (e.g., a threaded screw) that engages a "worm gear" (not depicted in FIG. 1) associated with finger 102. FIG. 5 depicts one example of such an arrangement, which may be referred to as a "sprung worm gripper." In some implementations, motor 104 may be non-backdrivable, e.g., by having a relatively high reduction ratio between the worm on transmission 114 and the worm gear. Put another way, when motor 104 is not operating, displacement L2 between motor 104 and finger 102 may remain unchanged.

In some implementations, another sensor 116 (which may be the same type of sensor as 112 or a different type of sensor) may be configured to measured displacement x between finger 102 and hard stop 110. Consequently, signals from both sensors 112 and 116 can be combined (d+x) to determine L2. Of course, this sensor arrangement is not meant to be limiting. Any sensor arrangement capable of directly or indirectly determining d and x may be employed, such as a sensor arrangement that measures L2 and d. In some implementations, sensor 116 may be a force or torque sensor that is deployed (e.g., in series with spring 108) to measure a force carried by spring 108. In some such implementations, the force of spring 108 may be measured directly rather than by using a spring deflection model.

More generally, sensors 112 and 116 may take various forms (and need not be the same form), such as linear or rotary sensors, relative or absolute position sensors, etc. Additionally, sensors 112 and 116 may employ various types of position sensing technology, such as magnetic encoding, optical encoding, etc. Moreover, depending on what technology they employ, sensors 112 and 116 may include any necessary transmission elements, such as gearing, linear-to-rotary convertors (or vice versa), as well as various conditioning circuitry and/or initialization routines (e.g., homing processes, calibration).

During operation of the robot, external forces $F_{external}$ may act upon finger 102. The force vector $F_{external}$ depicted in FIG. 1 indicates movement to the left, which may occur when finger 102 presses against an object/surface in the external environment, e.g., during grasping of an object. Since motor 104 is non-backdrivable, $F_{external}$ may cause corresponding structural force to be imparted on motor 104 in the leftward direction in FIG. 1, which compresses spring 108. External forces may be imparted on finger 102 from other directions as well, depending on how the robot is being operated. For example, forces (not depicted) that pull finger 102 rightward in FIG. 1 may eventually cause motor 104 to engage (e.g., abut) hard stop 110, at which point d=0. Intuitively, spring 108 adds compliance/flexibility to the grasping function of finger 102. Thus, the measurement by sensor 112 of d in effect makes sensor 112 act as a grasp force sensor.

In various implementations, system 100 may be operated as follows. To "close" finger 102 (i.e. increase L2), motor 104 may be driven to move finger 102 rightward in FIG. 1. If no external force is present, x and L2 may remain equal (assuming sensor 116 reports d=0 when $F_{external}$=0), or at least maintain a constant proportional relationship to each other. On the other hand, suppose $F_{external}$ is present, as depicted in FIG. 1. That force acting on finger 102 may reach an equilibrium at which $F_{external}$=−Kd (Hooke's Law). If $F_{external}$ is generated by an environmental impedance, such as an environmental stiffness $K_{env}$ such that $F_{external}$=−$K_{env}$× x_env_penetration, operating motor 104 to increase L2 may load both spring 108 (K) and $K_{env}$. This in turn may alter (e.g., increase) the location of finger 102 as represented by x, as well as the location of motor 104 represented by d. The variable x_env_penetration may represent penetration of finger 102 into a compliant environment (e.g., into a sponge). For example, in some implementations, x_env_penetration would be zero as finger 102 approaches a sponge, but would increase as finger 102 penetrates more deeply into the sponge. Accordingly, x_env_penetration could be stated as x−sponge_surface (the outer surface of the sponge first contacted by finger 102) such that, during penetration of finger 102 into the sponge (and assuming rightwards is defined as positive), x>sponge_surface, x_env_penetration>0, and $F_{external}$<0 (and is a reaction force on finger 102 to the left that resists additional penetration by finger 102 into the sponge).

If the environment is extremely stiff such that $K_{env}$>>K, operating motor 104 to increase L2 will result in relatively little leftward movement of finger 102, while motor 104 will move to the left by a relatively larger amount (increasing d proportionately). Put another way, grasp force as represented by d may increase to a greater degree than leftward movement of finger 102 as represented by x. In short, motor 104 may be operated to increase L2 until finger 102 contacts the environmental object that is providing the stiffness (impedance), after which point both x and d will increase (and d will increase more quickly). Driving motor 104 to "open" finger 102 (i.e. decrease L2) would have the opposite effects. It should be noted that environmental objects may also include components of a robot itself. For example, if a robot is instructed to pinch two fingers together (e.g., to cooperatively compress a stiff button), each finger may contact the other and impart environmental force on the other.

As indicated by the arrows originating from hard stop 110 near the bottom of FIG. 1, while controlling the robot, there may be a desired finger position $x_{desired}$ and a desired grasp force $d_{desired}$. Depending on the external environment, both goals may or may not be achievable simultaneously. For example, transmission 114 may experience internal loading due to $F_{external}$. This force may be reacted to by spring 108 (K). In many transmission designs, and particularly in implementations in which transmission 114 is implemented as part of a worm drive, this may result in an external load-dependent drive efficiency and starting force/torque. In particular, the loading may increase so-called contact normal forces (perpendicular to the surface) between finger 102 and the environmental object, especially Coulomb friction (or Coulomb damping) levels. Consequently, motor 104 may need to overcome this additional friction to change L2 for large desired grasp forces. This may impact performance and/or stability of a controller (see FIG. 2A). Static friction, or "stiction," may be particularly problematic because motor 104 potentially could be operated to drive one or more components of system 100 into an environment, ramp up interaction force d under lower dynamic friction, and become stuck after it stops because motor 104 may be unable to generate sufficient torque to overcome stiction.

Additionally, motor 104 may be selected to lower cost and/or achieve relatively small size. Consequently, motor 104 may only be able of achieving grasp forces d by operating in a non-continuous torque regime in which torque levels are generated that can only be sustained for a limited period of time, as more waste heat is generated than can be dissipated by motor 104. Extended operation may result in a thermally-driven failure of motor 104. For example, peak torque levels may be sustained for only a few seconds before a thermal protection feature clamps output to the continuous torque limit. Peak torque levels may not be accessed again until actual torque falls below a small fraction of the continuous limit for a sufficient amount of time. Like the friction challenges above, unacceptable system behavior can occur if a controller increases grasp force using a peak torque, which then falls back to, and then holds at the continuous motor torque level—resulting in a potentially unrecoverable stall, especially when the friction characteristics described above are included.

Figure 2A:
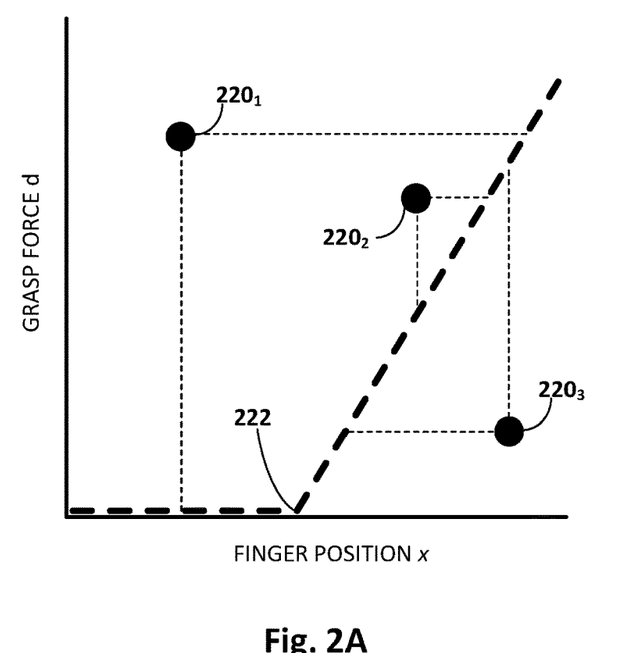
FIGS. 2A and 2B depict plots illustrating various aspects of the present disclosure.

FIG. 2A depicts a plot of grasp force d vs finger position x, with three possible grasp force/finger position targets, $220_{1-3}$. The thickest dashed line represents potential solutions in a scenario in which contact does not occur until finger 102 reaches a point, $x_{contact}$ (indicated at 222), and then force d increases as finger 102 penetrates the environment. As noted above, this can be modelled as a simple spring with stiffness $K_{env}$. While the force/position space is a two-dimensional plane, the actual force/position state may only lie on the thickest dashed line, which may not be known a priori and generally may be an arbitrary impedance. For an arbitrary force/position target 220, the controller may minimize a multi-objective cost function of position error $e_x$ and force error $e_d$, resulting in an equilibrium somewhere on the thickest dashed line of potential solutions. In other words, the controller may project the target 220 onto the space of potential solutions represented by the thickest dashed line, either explicitly or implicitly. FIG. 2A shows a fully position—weighted projection and fully force—weighted projection of each target to the potential solutions represented by the dashed line. This illustrates an increasing disparity between targets 220 when selected far away from the set of potential solutions represented by the dashed lines.

Accordingly, techniques are described herein for, given desired grasp positions ($x_{desired}$) and/or desired grasp torques or forces ($d_{desired}$) for gripper-style end effectors, determining robot instructions (e.g., actuator/joint control commands) that achieve stable tracking and/or manipulation of objects with acceptable response characteristics. For example, a control system that implements techniques described herein should avoid unrecoverable stall situations triggered by the various factors described above. In some implementations, control system techniques described herein may explicitly converge to either the position setpoint or the force setpoint, whichever is encountered first. Therefore, both targets act as a limit and the command interface may be interpreted as both "close to the desired position without exceeding the max grasp force" and "close to the desired grasp force without exceeding the max finger position."

Figure 2B:
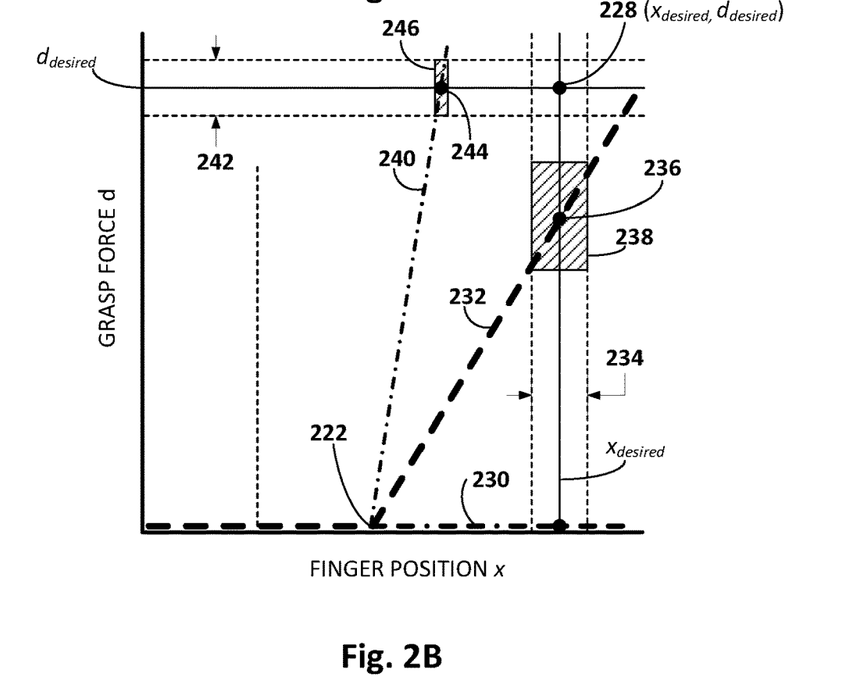

FIG. 2B illustrates behavioral features of a control system configured with selected aspects of the present disclosure on the same force-position plot as FIG. 2A. In this example, a single desired force and position target 228 ($x_{desired}$, $d_{desired}$) is considered for three scenarios: pure freespace (no physical contact between finger 102 and the environment), contact with a low stiffness environment, and contact with a higher stiffness environment. Potential solutions in freespace are indicated by the dash-dash-dot line 230 at bottom. In freespace there is no external grasp force, so transmission 114 is unloaded and at minimum friction levels. As will be seen in FIG. 3, it may be possible to implement a dedicated freespace controller that utilizes little or no so-called "deadband" (described in more detail below), has relatively low steady state position error, and has lower parameter uncertainty, since its operating region is restricted to a "well behaved" region of the gripper-style end effector's operating space. In various implementations, a dedicated freespace controller may be employed when, for instance, measured grasp force is below some threshold.

Now, suppose finger 102 makes contact with an environmental object (e.g., an object to be lifted or otherwise interacted with by finger 102). The dashed line 232 represents potential position/force solutions in a scenario in which finger 102 makes relatively soft contact with the environmental object. Once again contact occurs at 222, and force d increases as penetration occurs (i.e. x increases). Consequently, the position target $x_{desired}$ is reached before the grasp force target $d_{desired}$. Increased grasp force increases friction and stiction, and operation of motor 104 at these increased friction levels may exceed continuous limits. Accordingly, a position deadband 234 may be defined around a nominal effective setpoint 236. When current position x (e.g., measured by sensor 116) is within position deadband 234, the controller may not exert corrective effort to correct for positional errors $e_x$.

Without positional deadband 234 or some equivalent, system 100 (and more particularly, finger 102) may come to rest slightly off the target due to stiction effects and continue to exert effort against friction, which may heat motor 104 to unacceptable temperatures. Furthermore, if there is integral control action (e.g., error is accumulated over time) the system may suffer from hunting limit cycles that are characterized by stopping off target, remaining stationary while an integrator (which integrates error over time, e.g., an op-amp intergrator) winds up, breaking stiction and shooting past the target in the other direction, stopping off target due to stiction again, and repeating indefinitely. On the other hand, with positional deadband 234, an entire portion of dashed line 232 within region 238 may be considered "on target" (i.e. positional error $e_x$ is ignored). In various implementations, position deadband 234 may be tailored or "tuned" to allow a controller configured with selected aspects of the present disclosure to experience higher gains than would otherwise be tolerable, improving overall system performance and keeping motor 104 within acceptable temperature ranges.

The dash-dot-dashed line 240 represents potential position/force solutions in a scenario in which finger 102 makes contact with a relatively stiff environmental object (e.g., Kenv>>K). Once again contact occurs at 222. In this scenario, the grasp force target $d_{desired}$ is reached before the position position target $x_{desired}$. As was the case for positional control, a force deadband 242 may be defined around a nominal effective setpoint 244. When current grasp force d (e.g., as measured by sensor 112) is within force deadband 242, the controller may not exert corrective effector to correct for grasp force errors $e_d$. On the other hand, with force deadband 242, an entire portion of line 240 within region 246 may be considered "on target" (i.e. force error $e_d$ is ignored).

In various implementations, position deadband 234 and/or force deadband 242 may be static or dynamic. In the latter case, since friction and/or stiction increases proportionally with grasp force d, a force deadband 242 may be increased (e.g., widened) dynamically as a function of desired grasp force $d_{desired}$. In other implementations, other techniques may be employed in addition to or instead of deadbands, such as simple thresholds, a hysteresis, a blending function, etc.

Figure 3:
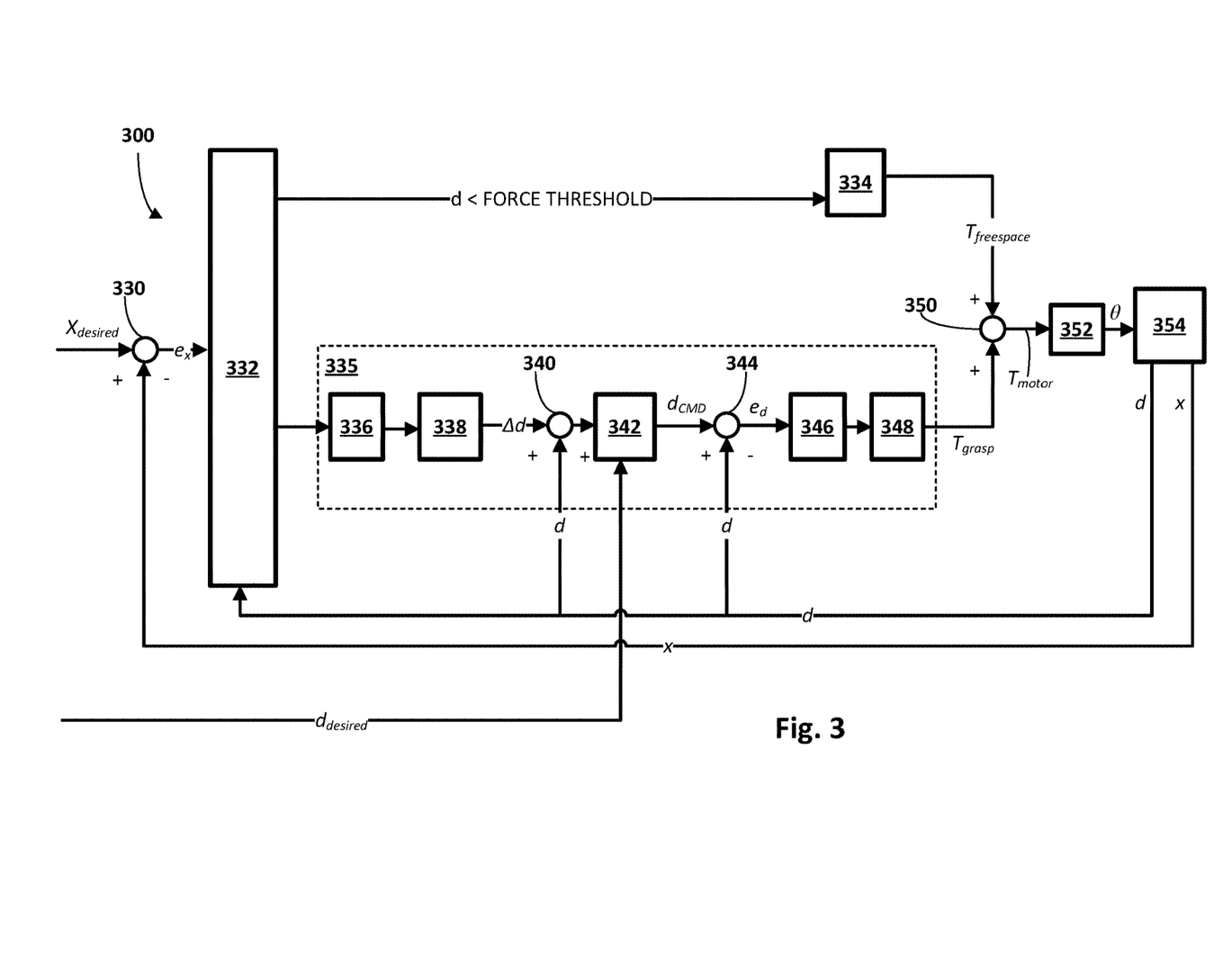
FIG. 3 schematically depicts an example controller architecture, in accordance with various implementations.

FIG. 3 schematically depicts an example controller architecture 300 configured with selected aspects of the present disclosure. Starting from the left, inputs may include commands in the form of a desired position $x_{desired}$ and a desired grasp force $d_{desired}$ (or alternatively, spring deflection). At 330, a position error, $e_x$, is evaluated, e.g., by determining a difference between $x_{desired}$ and a measured position x of finger 102. A controller selection logic 332 may compare a measured grasp force d (e.g., measured by sensor 112) to a measured grasp force-dependent threshold. If the measured grasp force d fails to satisfy the threshold, controller selection logic 332 may direct the position error $e_x$ to a freespace position controller 334. Otherwise, controller selection logic 332 may direct the position error $e_x$ to a cascaded grasp force-position controller 335. More generally, this decision may be generalized to any controller blending function. Additionally or alternatively, this may be generalized as a grasp force-dependent controller parameter scheduler, where instead of directing/assigning/distributing error to multiple controllers, this function re-parameterizes a single controller's parameters to exhibit the appropriate behavior.

Freespace position controller 334 may be configured to receive position error $e_x$ as input and generate, as output, a torque command $T_{freespace}$ for a torque-controlled motor 352. In various implementations, freespace position controller 334 may implement any known control law or laws appropriate for position control in the defined freespace regime, such as a proportional derivative ("PD"), proportional-integral ("PI"), proportional-integral-derivative ("PID"), proportional-integral-proportional ("PIP"), nonlinear control, feedforward/feedback linearization, etc. In some embodiments, freespace position controller 334 may implement a PID with integral drain.

Cascaded grasp force-position controller 335 may include a position error deadband component 336 that may come in various forms, such as a digitally-implemented software component, or any other suitable electrical circuits (e.g., variable deadband (voltage controlled) circuits). In various implementations, position error deadband component 336 may receive $e_x$ as input. Position error deadband component 336 may evaluate $e_x$ against a defined deadband region (e.g., 234 in FIG. 2) and, for instance, artificially reduce the output error $e_x$ to zero within the deadband. In other implementations, any function that has the effect of adequately reducing error $e_x$ in the vicinity of the target as appropriate for thermal protection of the motor and elimination of undesirable hunting motion may be employed. For example, in some implementations, a position error deadband component 336 may implement a continuous function approximation of a deadband, a deadband with hysteresis, an integral drain, etc. Additionally or alternatively, in some implementations, the deadband may be determined, e.g., by position error deadband component 336, based on measured grasp force (or torque) d or measured position x if desired.

Cascaded grasp force-position controller 335 may also include, e.g., downstream from position error deadband component 336, a grasp position controller 338. Grasp position controller 338, which may be implemented as software and/or as an op-amp network, may receive, as input, the deadband position error provided by position error deadband component 336 to generate and output a change in grasp force command Δd (not to be confused with motor force) relative to the current measured grasp force d sent to a grasp torque controller 348. In various implementations, grasp position controller 338 may implement any control law or laws appropriate for position control across various grasp force levels. In some implementations, grasp position controller 338 may implement a PID with asymmetric parameter tuning for closing finger 102 versus opening finger 102 (e.g., position errors with different signs may have different controller tunings).

In various implementations, the change in grasp force command Δd may be summed at 340 with the measured grasp force d to obtain the grasp force command. This may be provided to a target force clamp 342. Target force clamp 342 may then clamp this sum to the current desired force $d_{desired}$ provided as input. Target force clamp 342 may provide, as output, a clamped grasp force command $d_{cmd}$. At 344, a difference between the clamped grasp force command $d_{cmd}$ and measured grasp force d may be calculated as grasp force error $e_d$ and provided as input to a grasp force deadband component 346.

Grasp force deadband component 346 may be configured to apply a grasp deadband (e.g., 242 in FIG. 2) to the computed grip force error $e_d$. In some implementations, the grasp deadband component may be determined as a function of measured grasp forced, e.g., to reflect the increased friction/stiction in the transmission at relatively large grasp forces, and to account for a corresponding reduction in force resolution. In some implementations, grasp force deadband component 346 may implement a linear deadband function with offset and slope parameters, but any other suitable function may be implemented.

A grasp torque controller 348 may be configured to receive the deadband grasp force error produced by grasp force deadband component 346 and generate a torque command $T_{grasp}$ that is provided to torque-controlled motor 352. Like other controller blocks in FIG. 3, grasp torque controller 348 may utilize any appropriate control law(s). In some implementations, grasp torque controller 348 may take the form of a PID controller that implements one or more first order low pass filters on grasp force derivative(s), and may include an integral term that is scheduled in accordance with measured grasp force d. Scheduling of the integral, or more generally any controller parameters, against measured grasp force d is useful for normalizing performance and stability margins across a range of dissipative friction levels. As friction increases, grasp torque controller 348 may remain stable for increased feedback gains and recover performance that would otherwise be degraded by increased friction. In some implementations, this tuning may be closely related to design and tuning of the grasp force deadband component 346.

At 350, $T_{freespace}$ and $T_{grasp}$ may be combined into $T_{motor}$, which is then provided to torque-controlled motor 352. This may be effectively the same as selecting one or another, because in some implementations, controller selection logic 332 may set the unselected path to zero. In other implementations, $T_{freespace}$ and $T_{grasp}$ may be evaluated in parallel, and selection between the two may be performed at 350, rather than at controller selection logic 332. Torque-controlled motor 352 may comprise a motor (e.g., 104 in FIG. 1) driven with a torque control motor driver that includes, for instance, thermal protection limits. Torque-controlled motor 352 may rotate input of transmission 114 in response to $T_{motor}$ from freespace position controller 334 and grasp torque controller 348. To reduce hardware costs, torque-controlled motor 352 (and/or motor 104 in FIG. 1) may need to operate at motor torques/currents in excess of continuous thermal limits, introducing a nonlinear non-ideality (time-based, preemptive reduction from peak torque to continuous torque) that should be managed by freespace position controller 334 and/or grasp torque controller 348.

Component 354 in FIG. 3 may represent, for instance, the physical components of system 100 in FIG. 1. In other words, in response to $T_{motor}$, and as represented by θ torque-controlled motor 352 physically interacts with transmission 114, and sensors 112 and 116 measure d and x, respectively, and variously provide their output to components 330, 332, 340, and 344.

The architecture depicted in FIG. 3 may be implemented in myriad ways, at multiple rates, across multiple computing systems and/or using various types of hardware. For example, in some implementations, freespace position controller 334 may be implemented using one type of hardware and grasp torque controller 348 on different hardware, such as a so-called "realtime" computing system. In some implementations, controller selection logic 332 may be implemented by manipulating setpoints to grasp torque controller 348 and freespace position controller 334 over an industry standard cyclic position command interface. Similarly, in some implementations, when implementing PID control, grasp position controller 338 may implement the PI components on the same realtime computing system used to implement grasp torque controller 348, and may leverage the D (derivative) component from freespace position controller 334, since freespace position controller 334 may run at a much higher rate, improving performance. Many similar variations are possible.

Figure 4:
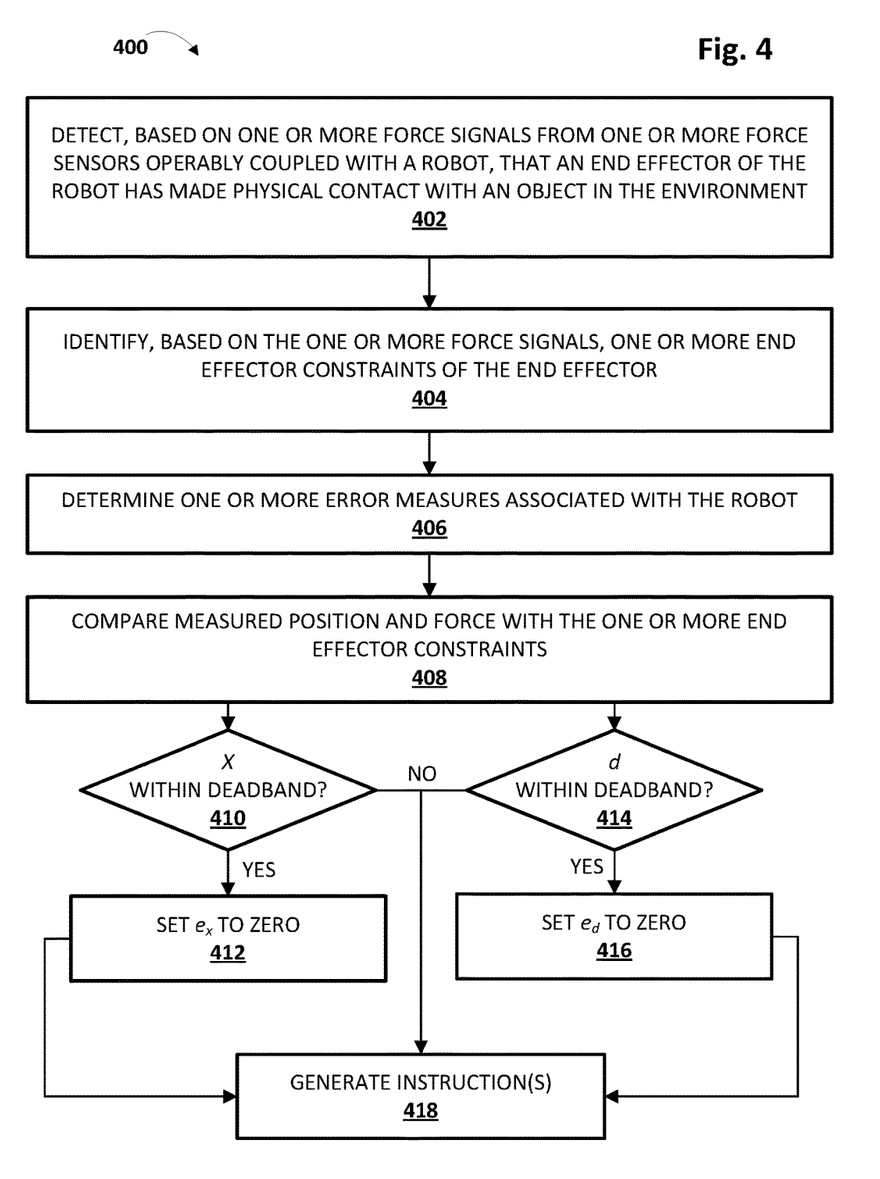
FIG. 4 depicts an example method for performing techniques described herein, in accordance with various implementations.

Referring now to FIG. 4, an example method 400 of determining robot instructions (e.g., actuator/joint control commands) that achieve stable tracking and/or manipulation of objects with acceptable response characteristics is described. For convenience, the operations of flow charts are described with reference to a system that performs the operations. This system may include various components, such as a controller. Moreover, while operations of method 400 are shown in a particular order, this is not meant to be limiting. One or more operations may be reordered, omitted or added.

At block 402, the system may detect, based on one or more force signals from one or more force sensors operably coupled with a robot, that an end effector of the robot has made physical contact with an object in the environment. Examples of when physical contact is detected are shown in FIGS. 2A and 2B at 222. In some implementations, physical contact with an environmental object may be detected when spring 108 is compressed or expanded from its default (e.g., equilibrium) state.

At block 404, the system may identify, based on the one or more force signals, one or more end effector constraints of the end effector. In various implementations, the end effector constraints may include a position constraint associated with position control of the end effector and/or and a grasp force constraint associated with grasp force control of the end effector. Examples of end effector constraints include the position deadband 234 and force deadband 242 shown in FIG. 2B. As noted above, these deadbands may be dynamically selected based on various signals, such as measured grasp force d, measured position x, etc.

At block 406, the system may determine one or more error measures associated with the robot. In various implementations, the one or more error measures may include one or more of: a position control error $e_x$ and a grasp force error $e_d$. In various implementations, the position control error $e_x$ may be indicative of an offset of the end effector (e.g., finger 102) from a desired position of the end effector, and the grasp force error $e_d$ may be indicative of an offset between force provided by the end effector and a desired grasp force. In some implementations, and as was depicted at 330 of FIG. 3, the position control error $e_x$ may be determined based on a difference between a desired position $x_{desired}$ and a measured position x. Similarly, grasp force error $e_d$ may be determined (e.g., at 344 of FIG. 3) based on a difference between clamped grasp force command $d_{cmd}$ and measured grasp force d.

At block 408, the system may compare the measured position and/or force with the one or more end effector constraints. For example, in some implementations, at block 410, the system may determine whether a measured position x falls within the position deadband 234. If the answer at block 410 is yes, then $e_x$ may be set to zero (or some other suitably small value) at block 412. Likewise, at block 414, the system may determine whether a measured grasp force d falls within force deadband 242 depicted in FIG. 2. If the answer at block 414 is yes, then $e_d$ may be set to zero (or some other suitably small value). Consequently, based on the comparisons of blocks 410 and 414, the system may reduce an impact of the one or more error measures on operation of the robot. For example, if either error measure is set to zero, then the impact those error measures will have on commands position control instructions and/or torque instructions generated at block 418 will be reduced, avoiding the issues caused by stiction, friction, and/or overheating described above.

FIG. 5 depicts an example gripper-style end effector 500 that includes many of the same components as were depicted in FIG. 1. End effector 500 includes two fingers, 502A and 502B that are coupled to an actuator 568. At least one finger, 502A in FIG. 5, is coupled to actuator 568 via a worm gear 570. Worm gear 570 in turn may be coupled to a worm 572 of transmission 514 (also referred to as a "shaft") of motor 504. End effector 500 also includes a spring 508, a carriage 574, a first sensor 512, and a second sensor 516.

When motor 504 is operated to rotate transmission 514, worm 572 also rotates, which in turn causes worm gear 570 to correspondingly rotate. Likewise, when external force (e.g., $F_{external}$ in FIG. 1) is imparted on finger 502A, the resulting movement of finger 502A also causes worm gear 570 to rotate. Because the high reduction ratio between worm 572 and worm gear 570 mentioned previously, worm 572 may not be back-drivable. Accordingly, rather than the external force causing worm 572 to rotate, the external force may cause actuators 568 and carriage 574 (which may be affixed to one another) to move together along an axis (horizontally in FIG. 5). When this happens, spring 508 is compressed or expanded from its equilibrium.

End effector 500 may include a variety of sensors, such as sensors 512 and 516. In some implementations, sensor 512 may take the form of an actuator encoder that, for instance, detects rotation of transmission 514. Sensor 512 may be positioned on transmission 514 as depicted in FIG. 5, or may be positioned elsewhere. In various implementations, sensor 512 may detect rotation of transmission 114 relative to motor 504, a base on end effector 500, and/or relative to other components. The other sensor 516 may take the form of, for instance, a potentiometer that is configured to detect a position of carriage 574 relative to a base of end effector 500.

Figure 6:
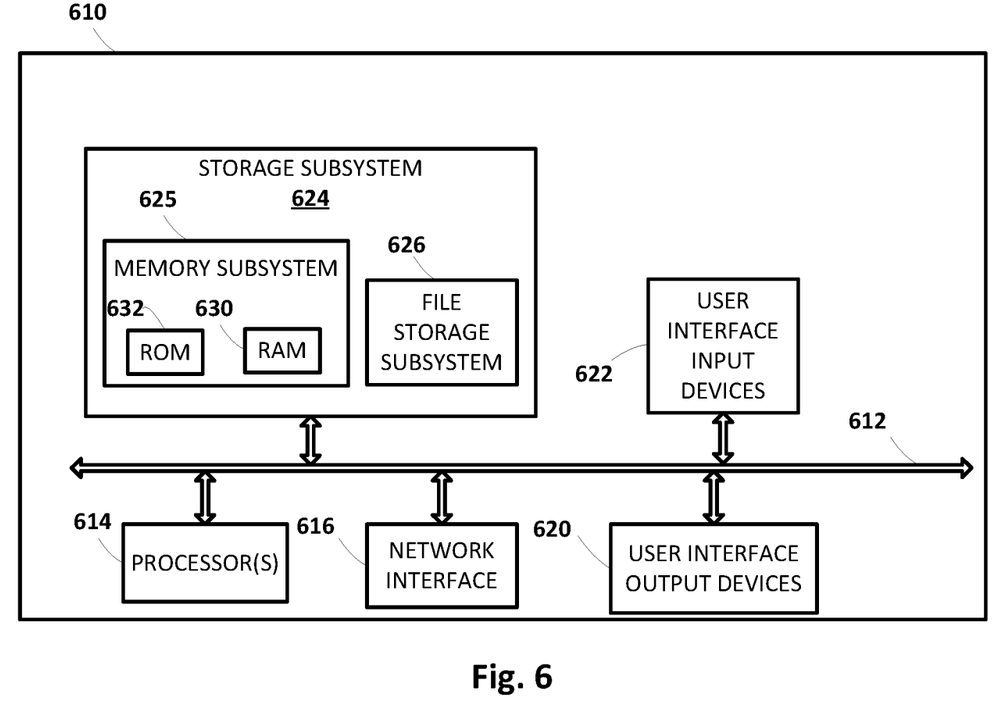
FIG. 6 schematically depicts an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 400, and/or to implement one or more aspects depicted in FIG. 3. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a CD-ROM drive, an optical drive, or removable media cartridges. Modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
   detecting, based on one or more force signals from one or more force sensors operably coupled with a robot, that an end effector of the robot has made physical contact with an object in an environment;
   identifying, based on the one or more force signals, one or more end effector constraints of the end effector, wherein the one or more end effector constraints include one or more of: a position constraint associated with position control of the end effector, and a grasp force constraint associated with grasp force control of the end effector;
   determining a measured position of the end effector and a measured force of the end effector;
   determining, based on the measured position and the measured force, one or more error measures associated with the robot, wherein the one or more error measures includes one or more of: a position control error, and a grasp force error, wherein the position control error is indicative of an offset of the end effector from a desired position of the end effector, and the grasp force error is indicative of an offset between force provided by the end effector and a desired grasp force;
   comparing the measured position or the measured force with the one or more end effector constraints, wherein the one or more end effector constraints include one or more deadbands in which one or more error measures associated with the robot are ignored; and
   based on the comparing, reducing an impact of the one or more error measures on operation of the robot.

2. The computer-implemented method of claim 1, wherein the identifying comprises identifying both the position constraint and the grasp force constraint.

3. The computer-implemented method of claim 1, wherein the reducing includes reducing an impact of the position control error on implementation of one or more position instructions.

4. The computer-implemented method of claim 1, wherein the reducing includes reducing an impact of the grasp force error on implementation of one or more grasp torque instructions.

5. The computer-implemented method of claim 1, wherein one or more of the deadbands are dynamic deadbands that are computed based on one or more signals.

6. The computer-implemented method of claim 5, wherein the dynamic deadbands are computed based on the one or more force signals.

7. The computer-implemented method of claim 5, wherein the dynamic deadbands are computed based on the desired grasp force.

8. The computer-implemented method of claim 1, wherein the one or more deadbands include a position deadband comprising a range of positions of the end effector in which the position control error is ignored.

9. The computer-implemented method of claim 1, wherein the one or more deadbands include a force deadband comprising a range of grasp forces in which the grasp force error is ignored.

10. A robot comprising at least one end effector and one or more processors and memory operably coupled with the one or more processors, wherein the memory stores instructions that, in response to execution of the instructions by one or more processors, cause the one or more processors to:
   detect, based on one or more force signals from one or more force sensors operably coupled with a robot, that the end effector of the robot has made physical contact with an object in an environment;
   identify, based on the one or more force signals, one or more end effector constraints of the end effector, wherein the one or more end effector constraints include one or more of: a position constraint associated with position control of the end effector, and a grasp force constraint associated with grasp force control of the end effector;

determine a measured position of the end effector and a measured force of the end effector;

determine, based on the measured position and the measured force, one or more error measures associated with the robot, wherein the one or more error measures includes one or more of: a position control error, and a grasp force error, wherein the position control error is indicative of an offset of the end effector from a desired position of the end effector, and the grasp force error is indicative of an offset between force provided by the end effector and a desired grasp force;

compare the measured position or the measured force with the one or more end effector constraints, wherein the one or more end effector constraints include one or more deadbands in which one or more error measures associated with the robot are ignored; and based on the comparison, reduce an impact of the one or more error measures on operation of the robot.

11. The robot of claim 10, wherein the identifying comprises identifying both the position constraint and the grasp force constraint.

12. The robot of claim 10, wherein the reducing includes reducing an impact of the position control error on implementations of one or more position instructions.

13. The robot of claim 10, wherein the reducing includes reducing an impact of the grasp force error on one or more grasp torque instructions.

14. The robot of claim 10, wherein one or more of the deadbands are dynamic deadbands that are computed based on one or more signals.

15. The robot of claim 14, wherein the dynamic deadbands are computed based on the one or more force signals.

16. The robot of claim 10, wherein the one or more deadbands include a position deadband comprising a range of positions of the end effector in which the position control error is ignored.

17. The robot of claim 10, wherein the one or more deadbands include a force deadband comprising a range of grasp forces in which the grasp force error is ignored.

18. At least one non-transitory computer-readable medium comprising instructions that, in response to execution of the instructions by one or more processors, cause the one or more processors to perform the following operations detecting, based on one or more force signals from one or more force sensors operably coupled with a robot, that an end effector of the robot has made physical contact with an object in an environment;

identifying, based on the one or more force signals, one or more end effector constraints of the end effector, wherein the one or more end effector constraints include one or more of: a position constraint associated with position control of the end effector, and a grasp force constraint associated with grasp force control of the end effector;

determining a measured position of the end effector and a measured force of the end effector;

determining, based on the measured position and the measured force, one or more error measures associated with the robot, wherein the one or more error measures includes one or more of: a position control error, and a grasp force error, wherein the position control error is indicative of an offset of the end effector from a desired position of the end effector, and the grasp force error is indicative of an offset between force provided by the end effector and a desired grasp force;

comparing the measured position or the measured force with the one or more end effector constraints, wherein the one or more end effector constraints include one or more deadbands in which one or more error measures associated with the robot are ignored; and based on the comparing, reducing an impact of the one or more error measures on operation of the robot.

* * * * *